Oct. 15, 1929.  F. V. WETHERILL  1,731,404
ORIFICE PLATE
Filed Nov. 15, 1926

INVENTOR
FREDERIC V. WETHERILL
BY John E. Hubbell
ATTORNEY

Patented Oct. 15, 1929

1,731,404

UNITED STATES PATENT OFFICE

FREDERIC VEAZEY WETHERILL, OF ARDMORE, PENNSYLVANIA, ASSIGNOR TO THE BROWN INSTRUMENT COMPANY, OF PHILADELPHIA, PENNSYLVANIA, A CORPORATION OF PENNSYLVANIA

ORIFICE PLATE

Application filed November 15, 1926. Serial No. 148,420.

The present invention relates to orifice plates of the type ordinarily used in flow meter installations, and the general object of the invention is to combine the orifice plate and separate gasket means in a unitary structure in a simple and effective manner.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of the invention.

Figure 1:
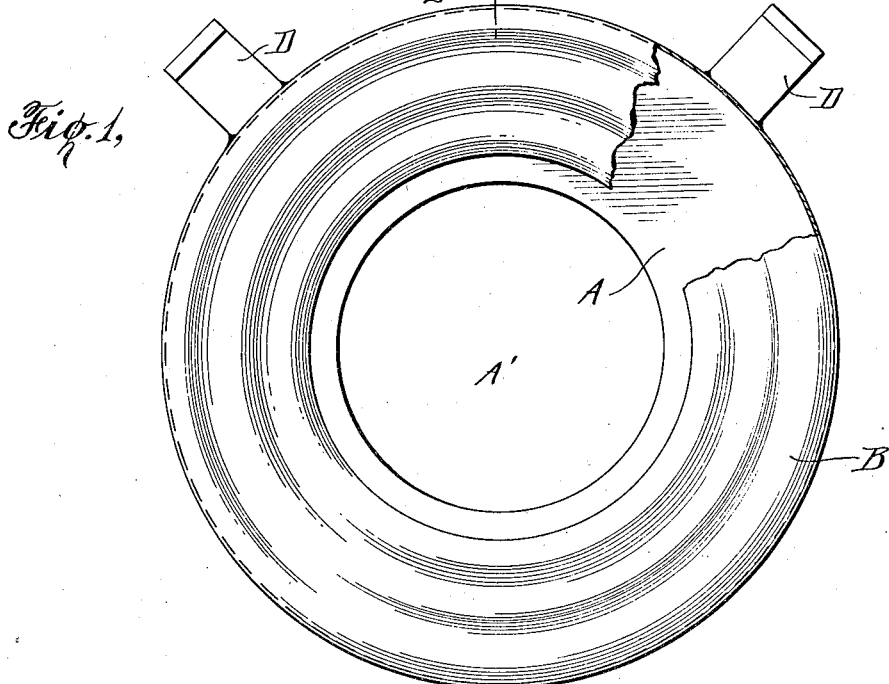
Fig. 1 is an elevation of the preferred form of my invention.

In the drawings, I have illustrated a combined orifice plate and gasket structure in which the outer portion of a flat orifice plate is wholly or substantially surrounded by a resilient corrugated metallic gasket member and in which yielding material is interposed between the adjacent faces of the orifice plate and gasket member, and in which the structure comprises metallic parts extending outward from the body of the structure for indicating the type of orifice and for use in handling and centering the unitary structure.

Figure 2:
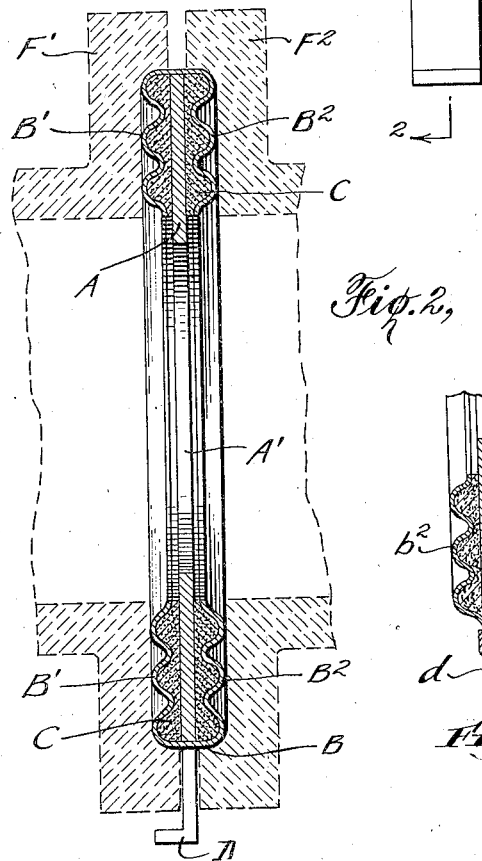
Fig. 2 is a section on the line 2—2 of Fig. 1.

In the preferred form shown in Figs. 1 and 2, the combination structure comprises a flat orifice plate A which has a central orifice A' and which ordinarily is circular in form and preferably is made of Monel metal.

Entirely surrounding the outer portion of the plate A is a gasket member B consisting of a cylindrical shell of yielding metal, preferably copper, and a yielding material C which may well be asbestos, interposed between the side portions of said shell and the adjacent faces of the orifice plate A. The shell B comprises resilient side portions B' and B² preferably in the form of corrugations concentric with the orific A'. Each side portion is formed with a central opening slightly larger in diameter than the orifice A'. The shell B with the corrugated side portions is preferably formed from an integral sheet of metal by a spinning operation about the plate A so that the outer portion of the plate is entirely surrounded by the shell B.

The shell B is provided with L-shaped metallic tabs D extending radially and outwardly at angularly spaced points on its circumference for centering and adjusting the combined structure in position between the pipe flanges F' and F². These tabs may be suitably marked to indicate the type and size of the orifice A'.

Figure 3:
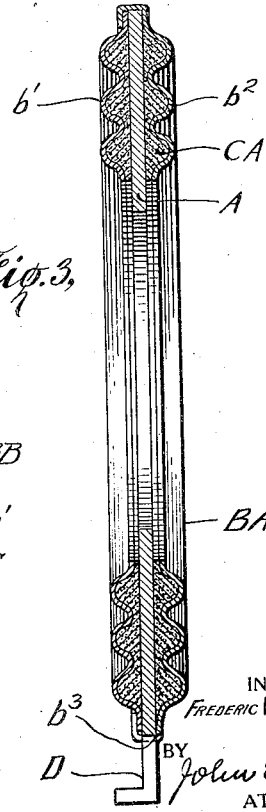
Fig. 3 is a section similar to Fig. 2 of a modified form of my invention.

In Fig. 3 is shown a modified form of the invention in which the shell BA consists of two corrugated sections $b'$ and $b^2$ of resilient metal. The section $b'$ may be formed by a spinning operation, but the section $b^2$ which is of slightly larger diameter, is preferably formed by a separate pressing operation. The sections are assembled on opposite sides of the orifice plate with the yielding material CA interposed between the corrugated portions and the plate and the circumferential edge portions of the section $b^2$ overlapping the edge portions of the section $b'$. The two sections are then secured together at their edge portions. In this construction the metallic tabs are formed integral with the orifice plate and project radially through slots or cut out portions $b^3$ in the outer part of the section $b^2$.

Figure 4:
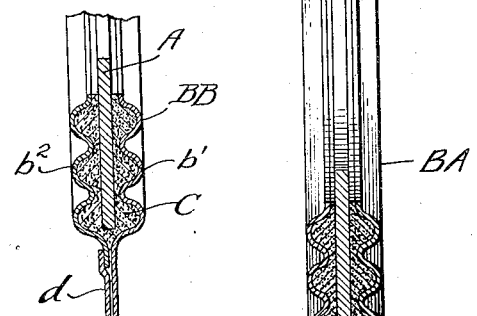
Fig. 4 is a section of the lower half of another modification.

In the modified construction shown in Fig. 4, the shell BB is substantially similar in construction to the shell BA of Fig. 3. The metallic tabs, integral with the orifice plate A in Fig. 3, are dispensed with and replaced by forming metallic tabs $d$ integral with the corrugated section $b^2$. This construction permits the periphery of the orifice plate A to be made circular, as in Fig. 1.

The construction shown in the present invention is especially advantageous as the corrugations of resilient material form a fluid-tight joint with the adjacent face of the pipe flange when in position and due to the resiliency of the metal tend to resume their original shape on removal. This feature permits re-use of the combined structure. The component parts are always in alignment due to the construction of the shell completely around the orifice plate. The metal tabs on the unified structure are especially useful in installing or removing the gasket structure.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent is:—

1. An orifice structure comprising an orifice plate, and a gasket comprising a yielding shell of metal enclosing the outer portion of said plate.

2. An orifice structure comprising an orifice plate, and a gasket comprising a shell of metal enclosing the outer portion of said plate and having yielding corrugated side portions adjacent the sides of said plate.

3. An orifice structure comprising an orifice plate, and a gasket comprising a shell of metal enclosing the outer portion of said plate and having yielding corrugated side portions adjacent the sides of said plate and a yielding material interposed between said corrugated portions and said plate.

4. An orifice structure comprising a metallic orifice plate, and a gasket comprising a metallic shell surrounding the outer portion of said plate and having corrugated side portions, a fibrous material between said corrugated portions and said plate, and a metallic tab projecting outwardly from said shell.

5. An orifice structure comprising a metallic orifice plate, and a gasket comprising a shell of resilient metal surrounding the outer portion of said plate and having corrugated side portions adjacent the opposite faces of said plate and a metallic tab secured to said plate, and projecting through said shell.

Signed at Philadelphia in the county of Philadelphia and State of Pennsylvania, this 12th day of November, A. D. 1926.

FREDERIC VEAZEY WETHERILL.